United States Patent Office 2,806,018
Patented Sept. 10, 1957

2,806,018

N-SUBSTITUTED ACRYLAMIDE AND POLYMERIZATION PRODUCTS THEREOF

John A. Price, Stamford, Conn., assignor to American Cyanamid Company, New York, N. Y., a corporation of Maine No Drawing. Application July 9, 1954,
Serial No. 442,453

2 Claims. (Cl. 260—80.5)

This invention relates to a new polymerizable monomer and to polymerization products thereof, including both homopolymers and copolymers of the new monomer. The scope of the invention also includes method features.

More particularly the present invention is directed to the production of a new N-substituted acrylamide and to polymerization products thereof. The N-substituted acrylamide with which the present invention is concerned is N-3-bis(2'-hydroxyethyl)aminopropylacrylamide, the formula for which is I 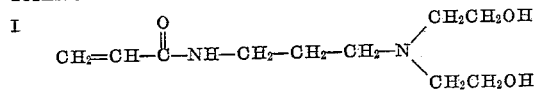

Both homopolymers of various average molecular weights and copolymers can be made of this new N-substituted acrylamide. My invention embraces polymerizable compositions comprising this new N-substituted acrylamide as the sole polymerizable monomer which is present therein, or in admixtures with one or more other substances which are copolymerizable therewith, for instance at least one other, different ethylenically unsaturated substance, more particularly one which contains a $CH_2=C<$ grouping; as well as products comprising the polymerized composition just described.

It is an object of the present invention to provide a new polymerizable monomer and homopolymers thereof of various average molecular weights.

Another object of the invention is to provide a new class of polymerizable compositions containing a new polymerizable monomer and one or more other comonomers copolymerizable therewith, and a new class of copolymer compositions from the said polymerizable compositions.

Another object of the invention is to provide new polymers and copolymers which have improved antistatic, hydrophilic and dyeing properties as compared with the previously known polymerization products.

Another object of the invention is to provide a new class of synthetic compositions, more particularly resinous polymers and copolymers, which are especially suitable for use in the plastics, coating, adhesive, laminating, molding and other arts.

Another object of the invention is the production of new copolymers, more particularly new acrylonitrile copolymer compositions, which are more readily dyed, especially with acid dyes, than homopolymeric acrylonitrile or many of the copolymers of acrylonitrile and another monomer or monomers that were known or suggested prior to my invention.

Another object of the invention is to prepare such acrylonitrile copolymers which can be spun or otherwise shaped to form filaments, tapes, ribbons, tubes, rods, sheets, etc., and the shaped articles then dyed either before or after having been oriented or treated to improve their useful properties.

Still other objects of the invention will be apparent to those skilled in the art from the description and examples which follow.

These objects are accomplished, in general, by preparing N-3-bis(2'-hydroxyethyl)aminopropylacrylamide and then polymerizing this compound either alone or admixed with another substance which is copolymerizable therewith. The polymerization product advantageously is prepared by polymerizing the polymerizable substance including the aforementioned N-substituted acrylamide in an aqueous medium with the aid of a polymerization catalyst, and recovering the resulting polymeric product by any suitable means, e. g., by filtration, centrifuging, etc.

Any suitable means may be used in effecting polymerization of the N-substituted acrylamide of Formula I, alone or admixed with one or more other substances which are copolymerizable therewith. Heat, light, or both heat and light, with or without a polymerization catalyst, can be used. A polymerization catalyst preferably is employed in order to shorten the period of time required for polymerization. Any of the polymerization catalysts which are suitable for use in polymerizing compounds containing an ethylenically unsaturated grouping, specifically a vinyl grouping, can be employed. Among such catalysts are the inorganic peroxides, e. g., hydrogen peroxide, barium peroxide, magnesium peroxide, etc., and the various organic peroxy catalysts, illustrative examples of which latter are: the dialkyl peroxides, e. g., diethyl peroxide, dipropyl peroxide, dilauryl peroxide, dioleyl peroxide, distearyl peroxide, di-(tert.-butyl) peroxide and di-(tert.-amyl) peroxide, such peroxides often being designated as ethyl, propyl, lauryl, oleyl, stearyl, tert.-butyl and tert.-amyl peroxides; the alkyl hydrogen peroxides, e. g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; and salts of inorganic per-acids, e. g., ammonium persulfate, sodium persulfate, potassium persulfate, sodium percarbonate, potassium percarbonate, sodium perborate, potassium perborate, sodium perphosphate, potassium perphosphate, etc. Other examples of organic peroxide catalysts that can be employed are the following:

Tetralin hydroperoxide
Tert.-butyl diperphthalate
Cumene hydroperoxide
Tert.-butyl perbenzoate
2,4-dichlorobenzoyl peroxide
Urea peroxide
Caprylyl peroxide
p-Chlorobenzoyl peroxide
2,2-bis(tert.-butyl peroxy)butane
Hydroxyheptyl peroxide
Diperoxide of benzaldehyde Other so-called "free radical" types of catalysts, e. g., $\alpha,\alpha'$-azodiisobutyronitrile, also can be used to accelerate polymerization.

If desired, the N-3-bis(2'-hydroxyethyl)aminopropylacrylamide or mixture thereof with another copolymerizable substance can be polymerized in emulsion or in solution state to yield a homopolymer or a copolymer. Good results are obtained by effecting polymerization while the polymerizable material is dissolved in a suitable solvent, preferably water or a liquid solvent comprising mainly water. Suitable inert organic solvents also can be used if desired, e. g., benzene, toluene, xylene, etc. Preferably the polymerization reaction is carried out in a liquid medium in which the substance to be polymerized is soluble but the polymer is insoluble, e. g., water.

The polymerization also can be effected by conventional bulk polymerization technique, in the presence or absence of a solvent capable of dissolving the monomer or monomeric mixture and in which the polymerizable material preferably is inert; or by conventional bead polymerization methods. Polymerization can be effected by a continuous process as well as by a batch operation.

The concentration of the catalyst is relatively small, e. g., from, by weight, about 1 part of catalyst per 1000 parts of the monomeric material to about 3 or 4 parts of catalyst per 100 parts of the said material.

The temperature of polymerization of the polymerizable composition comprising N-3-bis(2'-hydroxyethyl)aminopropylacrylamide can be varied over a wide range, up to and including or slightly above the boiling point (at atmospheric pressure) of the reaction mass. In most cases, the polymerization temperature will be within the range of about 20° or 30° C., preferably at least 35° or 40° C., up to the boiling temperature of the reaction mass, depending, for example, upon the particular catalyst, if any, used, the rapidity of polymerization wanted and other influencing factors. The use of polymerization temperatures substantially above the boiling point of the reaction mass is not precluded, but generally is less desirable because the polymerization reaction then must either be carried out in a closed reaction vessel under pressure, or, for economical reasons, with a reflux condenser or other means provided for the recovery and re-use of the volatilized monomer or monomers if the reaction is carried out at the boiling temperature of the mass under atmospheric pressure.

If desired, the monomer or monomers may be polymerized in the presence of a plasticizer for the polymer. Other polymerization methods, however, also may be employed, e. g., methods such as those described in U. S. Patents 2,140,048, 2,160,054, 2,194,354, 2,333,635, 2,436,926 and British Patent 586,881 with reference to the production of other polymerization products.

If the polymerization reaction is carried out while the polymerizable material is dissolved or dispersed in a liquid medium, e. g., in solution in water, the resulting polymer then is separated from the said medium by any suitable means, e. g., by filtration, centrifuging, solvent extraction, etc.

N-3-bis(2'-hydroxyethyl)aminopropylacrylamide may be used as a component of antistatic compositions, textile-treating and paper-treating compositions, as a beater additive in making paper, and for many other purposes. The homopolymer is also useful in many applications, e. g., as a modifier of a polymer of acrylonitrile to improve its dyeability, especially with acid dyes. Or, in order to modify the properties of the N-substituted acrylamide and to widen its field of utility, it can be copolymerized with other substances which are different therefrom and copolymerizable therewith, e. g., compounds containing a $CH_2=C<$ grouping which are different from the aforesaid acrylamide, unsaturated alkyd resins, mixtures of individual members of ether or both of these classes of polymerizable unsaturated materials, as well as other copolymerizable substances.

Illustrative examples of substances that can be copolymerized with N-3-bis(2'-hydroxyethyl)aminopropylacrylamide are different vinyl compounds, including the vinyl aromatic compounds, more particularly the vinyl aromatic hydrocarbons (e. g., styrene, the methyl and other alkyl styrenes, the various dialkyl styrenes, etc.), other aliphatic compounds containing a $CH_2=C<$ grouping, e. g., acrylonitrile and the various substituted acrylonitriles (e. g., methacrylonitrile, ethacrylonitrile, phenylacrylonitrile, etc.), the various acrylamides which are different from N-3-bis(2'-hydroxyethyl)aminopropylacrylamide (e. g., acrylamide itself, methacrylamide, ethacrylamide, the N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e. g., methacrylic acid, ethacrylic acid, phenylacrylic acid, etc.), more particularly the alkyl esters of an acrylic acid, e. g., the ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids including the alkyl acrylates containing not more than four carbon atoms in the alkyl grouping, examples of which are given above, as well as other vinyl aromatic and vinyl aliphatic compounds, and other compounds containing a $CH_2=C<$ grouping, more particularly a single $CH_2=C<$ grouping.

Other examples of copolymerizable substances that can be employed alone or in conjunction with one or more compounds containing a $CH_2=C<$ grouping include the polymerizable unsaturated alkyd resins (modified or unmodified), e. g., ethylene glycol maleate, diethylene glycol maleate phthalate, ethylene glycol maleate succinate and diethylene glycol maleate linoleate. Other and more specific examples of unsaturated alkyd resins that can be used are given, for example, in Nyquist and Kropa Patent No. 2,503,209, dated April 4, 1950, and patents referred to therein (see, for instance, column 8, lines 1–64).

Still other examples of materials that can be copolymerized with N-3-bis(2'-hydroxyethyl)aminopropylacrylamide are given in Kropa Patent No. 2,510,503 (e. g., column 2, line 46, to the end of the sentence in line 16, column 3; column 5, line 54, through line 46, column 7; and column 13, line 42, through line 30, column 16); and in the aforesaid Nyquist et al. Patent No. 2,503,209 (see, for instance, column 5, line 67, through line 75, column 7; and column 9, line 74, through line 12, column 11).

The proportions of the N-substituted acrylamide and unsaturated material which is copolymerizable therewith may be widely varied depending, for instance, upon the particular starting materials employed and the particular properties desired in the copolymer, e. g., in weight ratios of from 1:99 to 99:1, and more particularly from 5:95 to 95:5. Mainly for economical reasons, it is usually desirable that the N-substituted acrylamide does not exceed about 50% by weight of the total monomers. For example, I may use advantageously from 1% to 30% of the N-substituted acrylamide and from 70% to 99% of the other copolymerizable substance or substances, e. g., a different vinyl compound or compounds (or other copolymerizable ethylenically unsaturated compound or compounds), and more specifically acrylonitrile, acrylamide, acrylic acid, styrene, vinyl acetate, methyl acrylate, methacrylonitrile, methacrylamide, etc., in producing new and valuable copolymer compositions. The percentages just mentioned are by weight.

My invention has particular utility in preparing improved acrylonitrile copolymers. In making such copolymers, the proportions of any modifying comonomer or comonomers that are incorporated in the polymerizable composition together with the acrylonitrile and N-substituted acrylamide can be varied as desired or as conditions may require. Ordinarily, however, the acrylonitrile constitutes a major or preponderant proportion (more than 50%) by weight of the total weight of monomers to be copolymerized, the N-substituted acrylamide constitutes from about 1% to about 15 or 20%, or in some cases as high as 25 or 30%, of the total weight of the acrylonitrile and N-3-bis(2'-hydroxyethyl)aminopropylacryl amide, and any modifying comonomer or comonomers (if present in the polymerizable mixture) constitute the remainder of the total amount of comonomers which are subjected to copolymerization.

In the preferred acrylonitrile copolymer compositions (more particularly thermoplastic acrylonitrile copolymer compositions) of the present invention, the acrylonitrile is employed in the mixture of comonomers in an amount such that at least 80% by weight of combined arcylonitrile is present in the copolymer. When the polymerization rates of the acrylonitrile and additional monomer or monomers are different from each other, then it may be necessary to start with an amount of acrylonitrile either more or less than 80% by weight of the total mixture of monomers in order that the final copolymer will contain at least 80% by weight of combined acrylonitrile in the copolymer molecule. Similarly, in order that the finished, preferred copolymer shall contain, in the copolymer molecule, from about 1% to about 20% by weight of combined N-3-bis(2'-hydroxyethyl)aminopropylacrylamide, advantageously between about 2 or 3% and about 10% by weight of such combined compound, it may be necessary to start with an amount of the said N-substituted acrylamide either more or less than that which is present in the finished copolymer in order that the said copolymer will have the ultimate composition desired or required in order to impart thereto optimum dye receptivity and other improvements in properties, e. g., antistatic characteristics.

In order that those skilled in the art may better understand how the present invention can be carried into effect, the following examples are given by way of illustration and not by way of limitation. All parts and percentages are by weight.

EXAMPLE 1

*Preparation of N-3-bis(2'-hydroxyethyl)-aminopropylacrylamide*

To a reaction vessel equipped with a stirrer, addition funnel, and fitted on a water bath, are added 20 parts of acrylyl chloride and 0.1 part of hydroquinone dissolved in 40 parts of acetonitrile. The temperature of this solution is maintained between 25° and 35° C., while a solution containing 36 parts of bis(2-hydroxyethyl)-aminopropylamine dissolved in 40 parts of acetonitrile is slowly added over a period of 25 minutes. The temperature is raised to 50° C., where it is maintained for 2 hours. The product, which separates as a syrup, is dissolved in 120 parts of ethyl alcohol, and the solution is clarified by treatment with activated carbon, after which the latter is filtered off. The resulting solution is evaporated to dryness on a steam bath. Forty-two parts of N-3-bis(2'-hydroxethyl)aminopropylacrylamide hydrochloride is obtained as a yellow, syrupy liquid. This acid salt is converted to the free base by treatment with an equivalent amount of an alkali-metal hydroxide, e. g., sodium hydroxide, for instance in the form of an aqueous solution containing the same. The N-substituted acrylamide can be used in making homopolymers and copolymers either in the form of the free base or as the hydrochloric acid (or other acid) addition salt thereof.

The intermediate, bis(2-hydroxyethyl)aminopropylamine, can be prepared, for example, as follows.

To a reaction vessel equipped with a stirrer, thermometer and addition funnel, and fitted on a steam bath, is charged 4515 grams (43 moles) of diethanolamine, which is then heated to 70° C. To the vessel is next added 2280 grams (43 moles) of acrylonitrile over a period of 30 minutes while maintaining the reaction mixture at 70°–75° C. The reaction mass is stirred and heated at 75°–80° C. for 2 hours, after which it is cooled to 25° C. The resulting reaction product comprising bis(2-hydroxyethyl)aminopropionitrile is obtained in a yield amounting to 6760 grams. This product is then hydrogenated to form bis(2-hydroxyethyl)aminopropylamine, for instance as follows:

To an autoclave are charged 1170 parts of bis(2-hydroxyethyl)aminopropionitrile, 250 parts of dry ammonia, 1100 parts of denatured ethyl alcohol and 117 parts of nickel catalyst. The reaction mixture is held at a temperature of from 85° to 100° C. for 50 minutes under a presure of from 700 to 2000 lbs. per square inch. Bis(2-hydroxyethyl)aminopropylamine is obtained in a yield of 82% of the theoretical. The product boils at 145°–170° C. at 0.5–1.0 mm. The purity is approximately 99%.

The following examples, unless otherwise indicated, illustrate the preparation of homopolymers and copolymers of N-3-bis(2'-hydroxyethyl)aminopropylacrylamide either in its free base form or in the form of an acid-addition salt thereof.

EXAMPLE 2

To a reaction vessel are added 5.0 parts of N-3-bis(2'-hydroxyethyl)aminopropylacrylamide hydrochloride and 0.1 part of alpha,alpha'-azodiisobutyronitrile. The solution is heated on a steam bath for one hour. At the end of this time the syrupy liquid has changed to a sticky, viscous homopolymer of N-3-bis(2'-hydroxyethyl)aminopropylacrylamide hydrochloride. It can be used, for instance, as a thickening agent or as a modifier of urea-formaldehyde, melamine-formaldehyde and other synthetic resins and molding compositions which have insufficient plasticity during molding, thereby to improve their flow characteristics.

EXAMPLE 3

Example 2 is repeated except that the N-substituted acrylamide is used in its free base form, that is, as N-3-bis(2'-hydroxyethyl)aminopropylacrylamide, instead of in the form of its hydrochloric acid-addition salt. The properties of the resulting homopolymer are similar to those of the product of Example 2.

EXAMPLE 4

This example illustrates the preparation of homopolymeric acrylonitrile, which is subsequently employed in comparative dye tests with some of the copolymers of the present invention.

A reaction vessel, equipped with a stirrer, reflux condenser, thermometer and gas-inlet tube, is placed in a constant-temperature bath which is maintained at 35° C. To the vessel is added a solution of 53.0 parts of acrylonitrile, 900 parts of distilled water and 0.29 part of sulfuric acid. The pH of the initial solution is 3.1. A rapid stream of prepurified nitrogen is passed over the surface of the solution for 30 minutes. The nitrogen flow is then reduced to about one bubble per second. A reduction-oxidation catalyst system ("redox" system) consisting of 1.71 parts of ammonium persulfate and 0.71 part of sodium meta-bisulfite, each dissolved in 50 parts of water, is then added. The solution first becomes cloudy at the end of 3 minutes, and the polymerization is fairly exothermic for the first half hour. The polymerization is continued for a total of 4 hours at 35° C. The polymer is collected on a Büchner funnel, and washed with 1000 parts of distilled water followed by about 160 parts of methanol. The polymer is dried in an oven at 70° C. for about 16 hours. The yield of dry polyacrylonitrile, which is white, amounts to 48 parts.

EXAMPLE 5

To a reaction vessel, equipped as in Example 4, are added 50.35 parts of acrylonitrile, 2.65 parts of N-3-bis(2'-hydroxyethyl)aminopropylacrylamide hydrochloride and 900 parts of water. The pH of the solution is adjusted to 3.3 by the addition of 0.088 part of hydrochloric acid (as 100% acid). A rapid stream of prepurified nitrogen gas is passed over the surface of the solution for 30 minutes. The nitrogen flow is then reduced to about 1 bubble per second. To the vessel is next added 1.71 parts of ammonium persulfate and 0.36 part of sodium meta-bisulfite, each dissolved in 50 parts of water. The polymerization is carried out for 5 hours at 35° C. The product is collected on a Büchner funnel, washed with 2,000 parts of water, and dried in an oven at 70° C. for about 16 hours. The yield of dry, white copolymer of acrylonitrile and N-3-bis(2'-hydroxyethyl)-aminopropylacrylamide hydrochloride amounts to 48 parts.

Similar results are obtained when an equivalent amount of N-3-bis(2'-hydroxyethyl)aminopropylacrylamide in the form of a free base instead of as a hydrochloride is used, as described above, as the starting comonomer in forming a copolymer with acrylonitrile.

EXAMPLE 6

To a reaction vessel, equipped as in Example 4, are added 42.4 parts of acrylonitrile, 10.6 parts of N-3-bis-(2'-hydroxyethyl)aminopropylacrylamide hydrochloride and 800 parts of water. The pH of the solution is adjusted to 3.3 by the addition of 0.35 part of sulfuric acid. A rapid stream of pre-purified nitrogen gas is passed over the surface of the solution for 30 minutes. The nitrogen flow is then reduced to about two or three bubbles per second. A reduction-oxidation catalyst system is prepared by dissolving 1.71 parts of ammonium persulfate and 0.71 part of sodium meta-bisulfite, each dissolved in 100 parts of water. Portions of each solution are added to the reaction vessel at 25-minute intervals over a period of 2½ hours. During this period the temperature is maintained at 35° C. The polymerization is allowed to continue for a total period of 6 hours. The product is collected on a Büchner funnel, washed with 1,500 parts of water, and dried in an oven for about 16 hours at 70° C. Forty-four parts of a dry, light, cream-colored copolymer of acrylonitrile and N-3-bis(2'-hydroxyethyl)-aminopropylacrylamide mixed addition salt is obtained.

EXAMPLE 7

To a reaction vessel are charged 9.0 parts of acrylonitrile, 0.5 part of methyl acrylate, 0.5 part of N-3-bis-(2'-hydroxyethyl)aminopropylacrylamide, 90 parts of water and 0.1 part of ammonium persulfate. The solution is heated on a steam bath for one hour. The copolymer that precipitates is collected on a Büchner funnel, washed with 500 parts of water and dried in an oven at 70° C. for about 4 hours. The yield of dry, white copolymer (more particularly tripolymer or ternary polymer) of acrylonitrile, methyl acrylate and N-3-bis(2'-hydroxyethyl)aminopropylacrylamide amounts to 8.5 parts.

EXAMPLE 8

Samples of the homopolymeric acrylonitrile of Example 4 and of the copolymers of Examples 5, 6 and 7 are subjected to the following dye test:

A sample (5 parts) of the dry homopolymer or copolymer is added to a dye bath consisting of 500 parts of an aqueous solution containing 0.2 part of sulfuric acid, 1 part of sodium sulfate and 0.2 part of Calcocid Alizarine Blue SAPG (Color Index No. 1054). The dye bath is boiled for 30 minutes, after which the polymerization product is filtered off and washed with hot water until the water is free of dye. The copolymers of Examples 5, 6 and 7 are dyed blue, the intensity being proportional to the percentage of N-3-bis(2-hydroxyethyl)aminopropylacrylamide used in forming the copolymer, whereas the homopolymeric acrylonitrile of Example 4 fails to absorb any dye. The advantage of modifying an acrylonitrile polymerization product by replacing a part (e. g., from about 1% to about 15% or 20% or more, still more particularly from 2 or 3% to 8 or 10%) of the initial acrylonitrile or other monomer with N-3-bis(2'-hydroxyethyl)- aminopropylacrylamide, thereby to obtain a copolymeric substance of improved dyeability, is therefore quite apparent.

EXAMPLE 9

A copolymer (more particularly a tripolymer) is prepared from 93 parts of acrylonitrile, 5 parts of methyl acrylate and 2 parts of N-3-bis(2'-hydroxethyl)aminopropylacrylamide in essentially the same manner described under Example 7. This copolymer is dissolved in a concentrated aqueous solution of sodium thiocyanate (about 50% NaSCN in water) in proportions such as will yield a spinning solution containing about 9.3% of copolymer. This solution is filtered, placed under vacuum and allowed to deaerate for about 72 hours.

The aforementioned spinning solution is formed into a fiber by extruding it through a spinneret, having 40 holes 90 microns in diameter, into a coagulating bath comprising water maintained at a temperature of about 0° C. The spun fiber in gel state is continuously passed over a pair of converging wash rolls while it is advancing in a helical path. The fiber is rinsed with water on the rolls to remove excess thiocyanate. The washed fiber is stretched about 800% while passing through a bath of hot water maintained at a temperature of about 99.5° C., and then is taken up on a bobbin where it is kept in a gelled state by applying a fine spray of water while the fiber is being collected on the bobbin.

Individual swatches of the gelled fiber are bleached by bringing to a boil in 3% aqueous hydrogen peroxide, followed by water washing, then bringing to a boil in 35% nitric acid, and again washing with water. After drying at room temperature, the bleached swatches are dyed in the same manner as described under Example 8. The fibers are dyed to a deep shade of blue. In marked contrast, a fiber similarly prepared from homopolymeric acrylonitrile remains colorless when placed in the same dye bath for the same length of time.

EXAMPLE 10

To a reaction vessel are charged 9 parts of methacrylamide, 1 part of N-3-bis(2'-hydroxyethyl)aminopropylacrylamide, 40 parts of water and 0.1 part of ammonium persulfate. The solution is heated on a steam bath for 90 minutes. The copolymer is precipitated with an excess of methanol, collected, washed and dried as in Example 7. A good yield of a dry, white copolymer of methacrylamide and N-3-bis(2'-hydroxyethyl)aminopropylacrylamide is obtained.

EXAMPLE 11

To a reaction vessel are charged 9 parts of vinyl acetate, 1 part of N-3-bis(2'-hydroxyethyl)aminopropylacrylamide, 40 parts of water and 0.1 part of ammonium persulfate. The solution is heated on the steam bath for 2 hours. The copolymer that precipitates is collected, washed and dried as in Example 7. The yield of dry, white copolymer of vinyl acetate and N-3-bis(2'-hydroxyethyl)aminopropylacrylamide amounts to 6 parts.

EXAMPLE 12

To a reaction vessel are charged 8.5 parts of acrylonitrile, 1 part of diallyl phthalate, 0.5 part of N-3-bis(2'-hydroxyethyl)aminopropylacrylamide, 50 parts of water, 0.30 part of sodium lauryl sulfate (emulsifying agent) and 0.1 part of potassium persulfate. The emulsion is heated on a steam bath for one hour. At the end of this time the emulsion is broken, and the copolymer that precipitates is collected, washed and dried in the same manner as in Example 7. The yield of dry, white copolymer (more particularly tripolymer) of acrylonitrile, diallyl phthalate and N-3-bis(2'-hydroxyethyl)aminopropylacrylamide amounts to 7 parts.

EXAMPLE 13

To a reaction vessel are added 85 parts of N-3-bis(2'- hydroxyethyl)aminopropylacrylamide, 15 parts of acrylamide and 1 part of alpha, alpha'-azodiisobutyronitrile. The solution is heated on a steam bath for 4 hours. At the end of this period of time, the initially syrupy liquid mixture has changed to a sticky, viscous copolymer of acrylamide and N-3-bis(2'-hydroxyethyl)aminopropylacrylamide. It is more viscous than the homopolymeric products of Examples 2 and 3, and is useful for the same applications as the products of those examples, especially in applications where a liquid polymerization product of higher viscosity is desired.

EXAMPLE 14

Example 9 is repeated with the exception that 5 parts of acrylamide is substituted for 5 parts of methyl acrylate to produce a tripolymer of acrylonitrile, acrylamide and N-3-bis(2'-hydroxyethyl)aminopropylacrylamide, and a fiber is then produced from this tripolymer as described in Example 9 with particular reference to the production of a fiber from a tripolymer of 93 parts acrylonitrile, 5 parts of methyl acrylate and 2 parts of N-3-bis(2'-hydroxyethyl)-aminopropylacrylamide. The resulting fiber has properties which are very similar to the properties of the fiber of Example 9.

Substantially the same results are obtained when a fiber is similarly produced from a tripolymer of 93 parts of acrylonitrile, 2 parts of N-3-bis(2'-hydroxyethyl)aminopropylacrylamide and 5 parts of styrene, or acrylic acid, or methacrylic acid, or vinyl acetate, or methacrylamide, or methacrylonitrile, or mixtures of any of these last-named monomers in any proportions.

EXAMPLE 15

To a reaction vessel are charged 85 parts of styrene, 15 parts of N-3-bis(2'-hydroxyethyl)aminopropylacrylamide, 500 parts of water, 3 parts of sodium lauryl sulfate (emulsifying agent) and 2 parts of ammonium persulfate. The emulsion is heated on a steam bath for 4 hours. At the end of this time the emulsion is broken, and the copolymer that precipitates is collected, washed and dried in the same manner as in Example 7. A good yield of a copolymer of styrene and N-3-bis(2'-hydroxyethyl)aminopropylacrylamide is obtained. It can be molded into useful articles of manufacture, alone or admixed with a filler, dye, pigment, opacifier, lubricant, etc. The molded products have improved resistance to the accumulation of charges of static electricity and of dust, as compared with a product similarly made from homopolymeric acrylonitrile.

EXAMPLE 16

To a reaction vessel are charged 8 parts of acrylamide, 2 parts of N-3-bis(2'-hydroxyethyl)aminopropylacrylamide, 40 parts of water and 0.1 part of ammonium persulfate. The solution is heated on a steam bath for 2 hours. The copolymer is precipitated in an excess of methanol, collected and dried in a vacuum oven at 50° C. for 24 hours. A dry, white copolymer of acrylamide and N-3-bis(2'-hydroxyethyl)aminopropylacrylamide is obtained.

It will be understood, of course, by those skilled in the art that my invention is not limited to the specific ingredients named in the above illustrative examples nor to the particular proportions and methods mentioned therein. Variations in starting materials, proportions, methods of preparation, etc., can obviously be made, as has been indicated in the portion of this specification prior to the examples.

Although many of the new copolymers of this invention, especially those containing a substantial proportion of acrylonitrile, are particularly useful in the formation of fibers or filaments which are more amenable to dyeing than homopolymeric acrylonitrile, these and the other copolymers of the invention also have numerous other applications in the plastics and coating arts. For instance, with or without a filler or other additive, they may be used as molding compositions (or as components of molding compositions) from which molded articles are produced by molding the compositions under heat and pressure, e. g., temperatures of the order of 130° C. or 140° C. to 200° C. and under pressures up to 10,000 pounds or more per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions of my invention can be used in many different applications, for example as adhesives; in the treatment of paper or paper stock; in coating compositions; and for various other purposes. The polymer can be formed in situ after application of the monomer or mixture of monomers to the base material to be coated, impregnated or otherwise treated.

The unoriented and oriented fibers produced from my new fiber-forming copolymers are readily dyed, especially with an acid dye, while the fiber is in either a gel (e. g., aquagel) or a dry state. Such fibers or other shaped articles produced from the copolymers also have, in general, better antistatic properties than polymers in which no N-3-bis(2'-hydroxyethyl)aminopropylacrylamide has been incorporated.

N-3-bis(2'-hydroxyethyl)aminopropylacrylamide is also useful as an intermediate in producing new unsaturated quaternary ammonium compounds, which latter, in turn, can be polymerized either alone or with other comonomers to yield a new class of homopolymers and copolymers. Illustrative of quaternary ammonium compounds that can be produced from N-3-bis(2'-hydroxyethyl)aminopropylacrylamide are those represented by the general formula

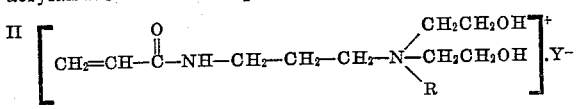

where R represents a monovalent hydrocarbon or hydroxyhydrocarbon radical and Y represents an anion. Illustrative examples of radicals represented by R in the above Formula II are the following: aliphatic (both saturated and unsaturated) hydrocarbon radicals (e. g., methyl, ethyl, propyl, isopropyl, butyl, isobutyl, sec.-butyl, tert.-butyl, amyl, isoamyl, hexyl, octyl, decyl, dodecyl, octadecyl, allyl, methallyl, ethallyl, propallyl, 2-butenyl, 3-butenyl, 3-methyl-2-butenyl, 3-methyl-3-butenyl, 2-pentenyl, 4-pentenyl, 2-methyl-2-pentenyl, 3-methyl-4-pentenyl, 2-hexenyl, 2,3-pentadienyl, 2,4-hexadienyl, 2-octenyl, 3-nonenyl, 2-decenyl, etc.), including cycloaliphatic (e. g., cyclopentyl, cyclopentenyl, cyclohexyl, cyclohexenyl, cycloheptyl, etc.); aromatic-substituted aliphatic hydrocarbon radicals (e. g., benzyl, phenylethyl, phenylpropyl, phenylisopropyl, cinnamyl, phenylallyl, etc.); aromatic hydrocarbon radicals (e. g., phenyl, biphenylyl, naphthyl, etc.); aliphatic-substituted aromatic hydrocarbon radicals (e. g., tolyl, xylyl, ethylphenyl, propylphenyl, isopropylphenyl, butylphenyl, vinylphenyl, allylphenyl, 2-butenylphenyl, etc.); and hydroxyhydrocarbon radicals corresponding to the aforementioned hydrocarbon radicals (the hydroxyalkyl radicals being a preferred class), e. g., hydroxyethyl, hydroxypropyl, dihydroxypropyl, hydroxyisopropyl, hydroxybutyl, dihydroxybutyl, hydroxyamyl, dihydroxyamyl, trihydroxyamyl, hydroxydecyl, dihydroxydodecyl, hydroxyoctadecyl, hydroxycyclohexyl, hydroxybenzyl, etc. For certain applications of the quaternary ammonium compounds embraced by Formula II, R advantageously is an alkyl radical containing at least 7 carbon atoms, for example, from 8 to 20 carbon atoms, inclusive.

Illustrative examples of anions represented by Y⁻ in Formula I are the chloride, bromide, iodide, sulfate, sulfonate, phosphate, hydroxide, borate, cyanide, carbonate, hydrocarbonate, thiocyanate, thiosulfate, isocyanate, sulfite, bisulfite, nitrate, nitrite, oxalate, silicate, sulfide, cyanate, acetate and the other common inorganic and organic anions.

The quaternary ammonium compounds embraced by Formula II are produced by quaternizing N-3-bis(2'-hydroxyethyl)aminopropylacrylamide with any suitable quaternizing agent, examples of which are: the alkyl and alkenyl halides (e. g., methyl, ethyl, butyl, lauryl, allyl, methallyl, etc., chlorides, bromides, etc.), alkyl sulfates such as the dimethyl, diethyl, dipropyl, dibutyl, diisobutyl, dioctyl, dilauryl, etc., sulfates, alkyl aryl sulfonates such as butyl benzene sulfonate, butyl toluene sulfonate, ethyl toluene sulfonate, octyl benzene sulfonate, etc. A general procedure for the preparation of such quaternary ammonium compounds, and which is given for purpose of illustration, is as follows: Approximately equivalent amounts of, for example, a hydrocarbon halide, specifically the chloride or bromide, and N-3-bis(2'-hydroxyethyl)-aminopropylacrylamide are mixed in a reaction vessel together with an equal volume of an inert diluent or reaction medium, e. g., benzene. The reaction temperature varies in specific cases between, for example, 25° C. and 100° C. The time of reaction also varies in specific cases from, for instance, 0.5 to 10 hours. The precipitated quaternary ammonium compound is then isolated, as by filtration through a Büchner funnel, washed thoroughly with fresh benzene or other suitable solvent for any unreacted material, and dried, for instance under vacuum in a desiccator.

Homopolymers and copolymers can be produced from a quaternary ammonium compound of the kind embraced by Formula II, for instance in the same manner described hereinbefore with particular reference to the production of polymerization products (both homopolymers and copolymers) of N-3-bis(2'-hydroxyethyl)aminopropylacrylamide and using the same (as well as other) comonomers in making copolymers.

I claim:

1. A product comprising a ternary polymer of copolymerizable ingredients including (1) acrylonitrile, (2) N-3-bis(2'-hydroxyethyl)aminopropylacrylamide and (3) at least one other different ethylenically unsaturated substance including methyl acrylate, the acrylonitrile of (1) constituting at least about 70% by weight of the total amount of (1) and (2) and (3), the compound of (2) constituting from about 1% to about 20% by weight of the total amount of (1), (2) and (3), and the substance of (3) constituting the remainder.

2. The method of preparing a ternary polymer of copolymerizable ingredients including (1) acrylonitrile, (2) N-3-bis(2'-hydroxyethyl)aminopropylacrylamide and (3) at least one other different ethylenically unsaturated substance including methyl acrylate, the acrylonitrile of (1) constituting at least about 70% by weight of the total amount of (1) and (2) and (3), the compound of (2) constituting from about 1% to about 20% by weight of the total amount of (1), (2) and (3), and the substance of (3) constituting the remainder, which comprises polymerizing said ingredients with the aid of a polymerization catalyst selected from the group consisting of inorganic peroxides, organic peroxides, salts of inorganic per-acids and free radical type catalysts.

References Cited in the file of this patent

UNITED STATES PATENTS 2,649,438   Bruson _____ Aug. 18, 1953